US011061935B2

(12) United States Patent
Guha et al.

(10) Patent No.: US 11,061,935 B2
(45) Date of Patent: Jul. 13, 2021

(54) AUTOMATICALLY INFERRING DATA RELATIONSHIPS OF DATASETS

(71) Applicant: Microsoft Technology Licensing, LLC, Redmond, WA (US)

(72) Inventors: Saikat Guha, Seattle, WA (US); Gary Kyle Soeller, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 16/289,719

(22) Filed: Mar. 1, 2019

(65) Prior Publication Data

US 2020/0278986 A1   Sep. 3, 2020

(51) Int. Cl.
G06F 16/28   (2019.01)
G06N 5/04   (2006.01)

(52) U.S. Cl.
CPC ............. G06F 16/285 (2019.01); G06N 5/04 (2013.01)

(58) Field of Classification Search
CPC ................................ G06F 16/285; G06N 5/04
See application file for complete search history.

(56) References Cited

U.S. PATENT DOCUMENTS

| 9,998,484 | B1 * | 6/2018 | Buyukkayhan | ....... G06F 16/285 |
| 2007/0005556 | A1 | 1/2007 | Ganti et al. | |
| 2007/0078846 | A1 * | 4/2007 | Gulli | ..................... G06K 9/6203 |
| 2010/0223726 | A1 * | 9/2010 | Maloney | .................. A47D 7/00 |
| | | | | 5/500 |
| 2011/0212717 | A1 * | 9/2011 | Rhoads | .................... G06F 16/58 |
| | | | | 455/420 |
| 2012/0215853 | A1 | 8/2012 | Sundaram et al. | |
| 2012/0310990 | A1 | 12/2012 | Viegas et al. | |
| 2015/0317383 | A1 * | 11/2015 | Alkov | ..................... H04L 51/04 |
| | | | | 707/738 |
| 2016/0232221 | A1 * | 8/2016 | McCloskey | ........... G06F 16/285 |
| 2017/0139919 | A1 * | 5/2017 | Ball | ....................... G06F 16/248 |

(Continued)

FOREIGN PATENT DOCUMENTS

WO   2016209213 A1   12/2016

OTHER PUBLICATIONS

Shrivastava, Anshumali, "Probabilistic Hashing Techniques for Big Data", Cornell University, Aug. 2015, retrieved from https://www.cs.rice.edu/~as143/Doc/Anshumali_Shrivastava.pdf on Feb. 20, 2019, 192 pages.

(Continued)

Primary Examiner — Eliyah S. Harper
(74) Attorney, Agent, or Firm — Rainier Patents, P.S.

(57) ABSTRACT

Described herein is a system and method for inferring data relationships of a plurality of datasets. Data contents (and optionally metadata) of the plurality of datasets are scanned to extract features of each of the datasets. Features can be related to a structure of data, a profile of data within the dataset, and/or metadata of the dataset. Each feature has an associated weight. The datasets can be clustered into clusters based on at least some of the weighted features (e.g., based on a sim-hash or min-hash of the dataset). A precise similarity metric is computed between datasets in each cluster based on their weighted features. Datasets with precise similarity metrics above a threshold quantity are inferred to be being likely related. Information is provided regarding the inferred likely related datasets.

20 Claims, 4 Drawing Sheets

(56) References Cited

U.S. PATENT DOCUMENTS

| | | | | |
|---|---|---|---|---|
| 2017/0220652 | A1* | 8/2017 | Kazi | G06Q 50/01 |
| 2018/0239829 | A1* | 8/2018 | Dialani | G06Q 10/063112 |
| 2018/0239830 | A1* | 8/2018 | Dialani | G06Q 10/1053 |
| 2018/0365262 | A1 | 12/2018 | Fang et al. | |
| 2020/0251213 | A1* | 8/2020 | Tran | G16H 20/10 |

OTHER PUBLICATIONS

Wikipedia.org, "MinHash", retrived from: https://en.wikipedia.org/wiki/MinHash on Mar. 1, 2019, 6 pages.

Halevy, et al., "Goods: Organizing Google's Datasets", In Proceedings of the International Conference on Management of Data, Jun. 26, 2016, pp. 795-806.

"International Search Report and Written Opinion Issued in PCT Application No. PCT/US20/018933", dated May 12, 2020, 12 Pages.

Wu, et al., "A Review for Weighted MinHash Algorithms", In the Repository of arXiv:1811.04633, Nov. 12, 2018, 16 Pages.

* cited by examiner

AUTOMATICALLY INFERRING DATA RELATIONSHIPS OF DATASETS

BACKGROUND

Large organizations such as corporations, governments, etc. can store increasingly greater amounts of data. Heterogeneous big-data systems may have hundreds of millions of datasets. Many of the datasets can be related. For example, one dataset may be an exact copy of another but stored in a different underlying store; one dataset may be a near-copy of another; one dataset may have been derived from another through filters, projection, or aggregation; two or more datasets may have been joined and so on.

SUMMARY

Described herein is a system for inferring data relationships of a plurality of datasets, comprising: a processing system comprising a processor and a memory having computer-executable instructions stored thereupon which, when executed by the processor, cause the processing system to: algorithmically scan data contents of the plurality of datasets to extract features of each of the datasets, wherein each feature has an associated weight; cluster the datasets into clusters based on at least some of the weighted features; compute a precise similarity metric between datasets in each cluster based on their weighted features; infer datasets with precise similarity metrics above a threshold quantity as being likely related; and provide information regarding the inferred likely related datasets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
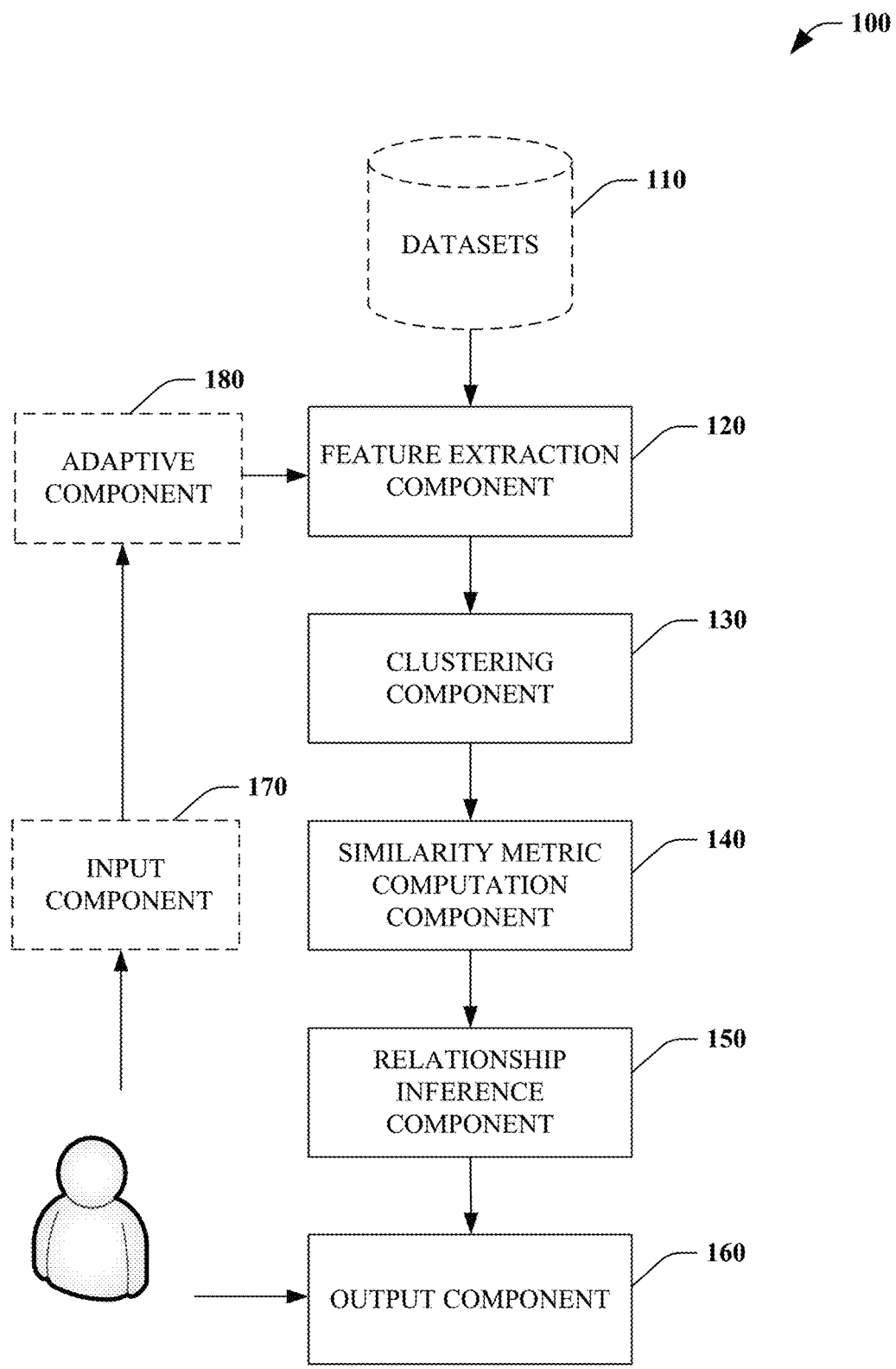
FIG. 1 is a functional block diagram that illustrates a system for inferring data relationships of datasets.

Various technologies pertaining to automatically inferring data relationships of datasets are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding automatically inferring data relationships of datasets. What follows are one or more exemplary systems and methods.

Aspects of the subject disclosure pertain to the technical problem of identifying related datasets. The technical features associated with addressing this problem involve algorithmically scanning data contents of the plurality of datasets to extract features of each of the datasets, wherein each feature has an associated weight; clustering the datasets into clusters based on at least some of the weighted features; computing a precise similarity metric between datasets in each cluster based on their weighted features; inferring datasets with precise similarity metrics above a threshold quantity as being likely related; and providing information regarding the inferred likely related datasets. Accordingly, aspects of these technical features exhibit technical effects of more efficiently and effectively reducing computational resource(s) and/or bandwidth used to identify related datasets.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Large organizations such as corporations, governments, etc. can store increasingly greater amounts of data created with various tools or processes. Heterogeneous big-data systems may have hundreds of millions datasets, many of which are related. For example, one dataset may be an exact copy of another but stored in a different underlying store; one dataset may be a near-copy of another; one dataset may have been derived from another through filters, projection, or aggregation; two or more datasets may have been joined and so on. Determining these relationships often requires a deep understanding of the tool or process that created the dataset; however, there may be hundreds or even thousands of such tools making it impractical to understand any sizeable fraction of them to determine dataset relationships.

Described herein is a system and method to automatically infer data relationships of datasets. Features can be computed automatically by algorithmically scanning the data contents and metadata of the dataset, and the features used to automatically infer relationships between these datasets in a way that scales to large datasets (e.g., billions of datasets). For example, the relationships can be inferred without access to query(ies) used to generate the datasets.

Referring to FIG. 1, a system for inferring data relationships of datasets 100 is illustrated. The system 100 can automatically infer data relationships (e.g., copied, derived, aggregated, joined) of a plurality of datasets 110 storing collections of data.

In some embodiments, the datasets 110 comprise relational databases comprising one or more tables (e.g., relation(s)) of column(s) (e.g., attribute(s), field(s)) and row(s) (e.g., record(s)). Relationship(s) can logically connect tables to one another. In some embodiments, the datasets 110 comprise object-oriented data structures, hierarchical data structures, and/or network data structures that store data according to schema(s). In some embodiments, data content of the datasets 110 is stored in a plurality of formats.

The system 100 includes a feature extraction component 120 that algorithmically scans data and/or metadata contents of the plurality of datasets 110 to extract features of each of the datasets. Each feature can have significance in inferring relationships between various datasets of the plurality of datasets 110.

In some embodiments, features can include one or more aspects related to a structure of data within the dataset (e.g., schema). Features can include a name (e.g., column name, object name), a datatype (e.g., integer, floating point, string), and/or a format (e.g., five digits, string of a particular format).

In some embodiments, features can be computed or determined based upon one or more aspects related to a profile of data within the dataset. For example, features can include a data profile (e.g., mask), a length histogram, a value histogram, a minimum value, a maximum value, a min-hash, a sim-hash, a data sketch, a pattern match, and/or a data sample. "Min-hash" refers to a value computed using a min-hash function (e.g., min-wise independent permutations locality sensitive hashing scheme). "Sim-hash" refers to a value computed using a sim-hash function. Min-hash and sim-hash are two techniques for estimating how similar two sets are. In some embodiments, a sim-hash and/or a min-hash can be computed based upon schema name (e.g., column name), schema format (e.g., column format), type (e.g., column type), data sample(s), and/or resource uniform resource identifier(s) (URIs).

In some embodiments, features can include one or more aspects of metadata related to the dataset. For example, features can include a timestamp, a dataset name, one or more column names, one or more column types, and/or tags. In some embodiments, prior to being utilized, one or more of the extracted and/or computed features are normalized. For example, schema names can be stemmed.

Each feature has an associated weight, with the associated weight based on significance in inferring relationships. That is, features having a higher associated weight are more significant in inferring relationships and features having a lower associated weight are less significant in inferring relationships. A weight of zero is indicative of the associated feature not being utilized for purposes of clustering. In some embodiments, the associated weights are determined and/or adaptively modified using a machine-learning algorithm, as discussed below. In some embodiments, the associated weights are determined manually (e.g., based upon user input). In some embodiments, one or more features can be determined For example, text frequency-inverse document frequency (TF-IDF) can be employed to weight unique schema portion(s) (e.g., column name, dataset name, mask) more heavily than more frequently occurring names. In this manner, two datasets having a column with a unique name ("Microsoft Accounts Payable Identifier") are more likely to be related than two datasets having a column with a commonly occurring name ("Name"). Similarly, two datasets having a column with a unique mask such as three uppercase letters followed by a period and three digits ("ABC.123") can be weighted more heavily than a column with more frequently occurring mask ("123").

For big-data systems having hundreds of millions of datasets comparing features of a first dataset with each of the remaining hundreds of millions of datasets to identify similar datasets is not practical. In order to significantly reduce the complexity of comparison, the system 100 first approximately clusters datasets into candidate clusters based on the weighted features, with datasets members of each cluster being potentially related to one another.

The system 100 thus further includes a clustering component 120 that clusters (e.g., approximately) the datasets into clusters based on the weighted features using a streaming approximate clustering algorithm. In some embodiments, a min-hash value of at least some of the weighted features is generated for each dataset (e.g., in parallel) and used to create the clusters. In some embodiments, a sim-hash value of at least some of the weighted features is generated for each dataset (e.g., in parallel) and used to create the clusters. In some embodiments, the clustering component 120 can sort the datasets into clusters with a similarity metric computation component 130 comparing adjacent or nearby datasets to infer likely related datasets. In some embodiments, the approximate clustering can be performed iteratively, for example, over sim-hash values of different weighted features or groups of weighted features, with the results of each iteration combined together for greater accuracy in determining meaningful clusters.

Once the approximate clusters have been created, a similarity metric computation component 130 computes a precise similarity metric between datasets in each cluster based on at least some of their weighted features. In some embodiments, the precise similarity metric is based on one or more similarity functions such as Jaccard similarity, cosine similarity, edit distance, and the like. Based upon the precise similarity metric, a relationship inference component 140 can infer that datasets with precise similarity metrics above a threshold quantity are likely related. In some embodiments, the threshold quantity is determined based upon user input. For example, a user can indicate that the threshold quantity is 95%, that is, datasets with precise similarity metrics of 95% probability or greater are identified as being likely related.

The system 100 also includes an output component 150 that provides information regarding the inferred likely related datasets. In some embodiments, the information can include identification of the related datasets. In some embodiments, the information can include metrics with respect to the basis for the inferred relationship based, at least in part, upon the extracted (or computed) features. For example, column name(s) are unique, minimum values are the same, maximum values are the same, data mask is the same, etc.

In some embodiments, the system 100 can optionally include an input component 170 and an adaptive component 180. The input component 170 can receive user feedback (e.g., positive and/or negative) regarding the information provided regarding the inferred likely related datasets. For example, a user can provide feedback that two datasets identified as likely related datasets were not related (e.g., negative feedback) and/or that two datasets identified as likely related datasets were determined to be related (e.g., positive feedback).

The input component 170 can provide the received user feedback to an adaptive component 180. The adaptive component 180 can modify weight(s) associated with feature(s) used by the feature extraction component 120 in accordance with at least some of the provided information regarding the inferred likely related datasets and the received user feedback.

In some embodiments, the modified weight(s) can be determined using an algorithm initially trained using a machine learning process that utilizes various features present in datasets with the algorithm representing an association among the features. In some embodiments, the algorithm is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, Artificial Neural Network (ANN), and/or a Gradient Boost & Adaboost algorithm. The algorithm can be trained in a supervised, semi-supervised and/or unsupervised manner.

Figure 2:
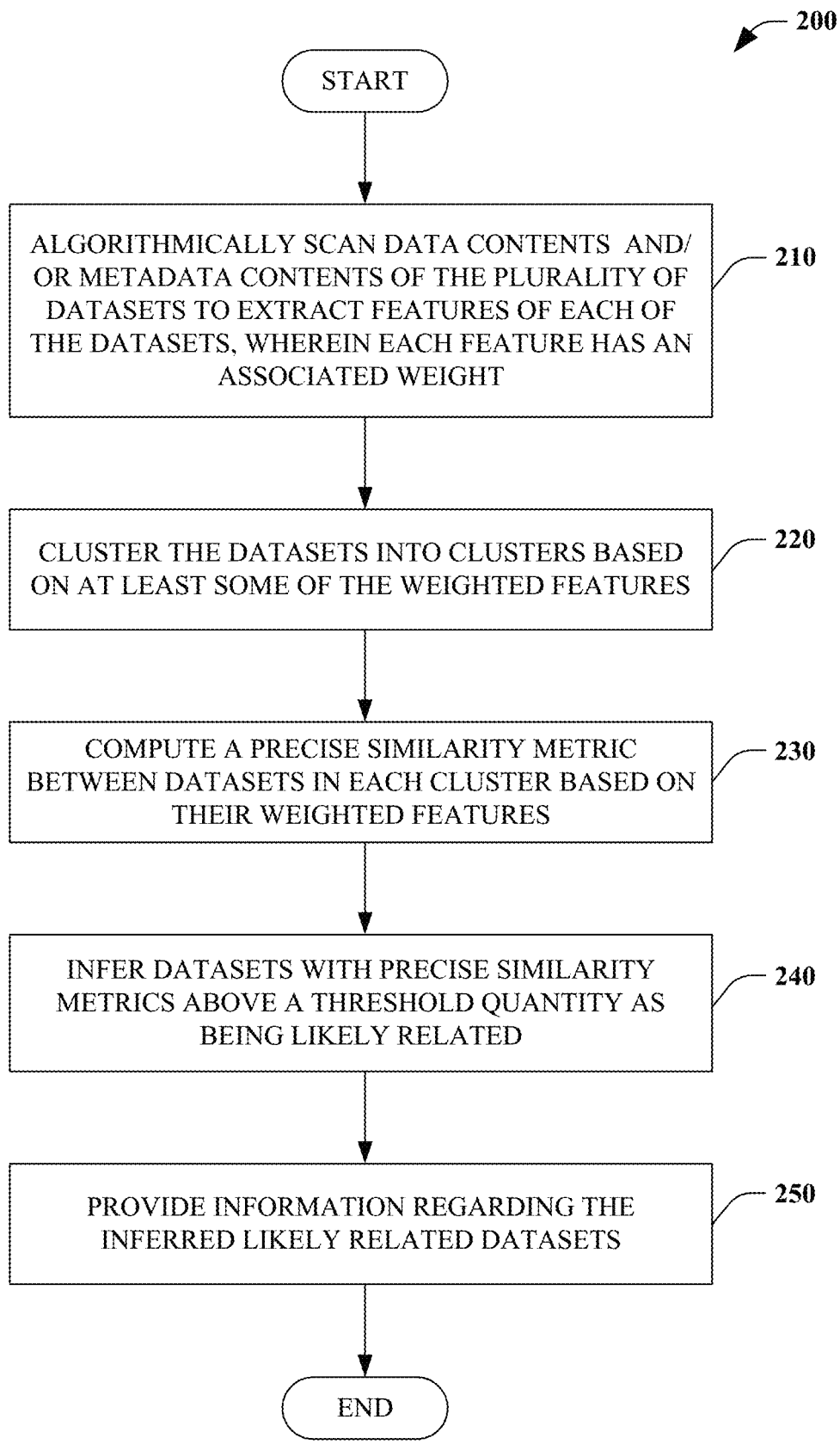
FIG. 2 is a flow chart of a method of inferring data relationships of a plurality of datasets.
Figure 3:
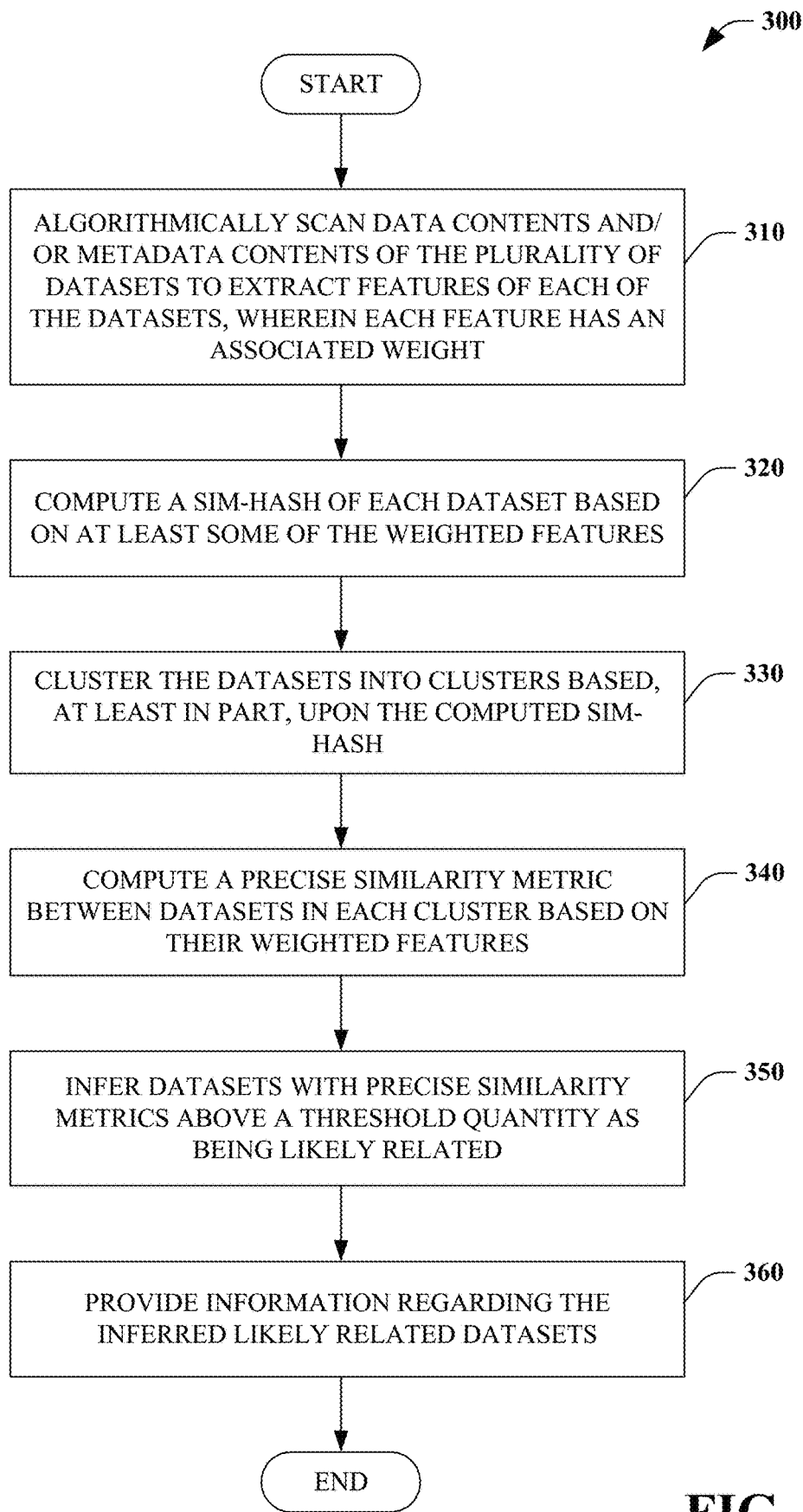
FIG. 3 is a flow chart of a method of inferring data relationships of a plurality of datasets.

FIGS. 2 and 3 illustrate exemplary methodologies relating to inferring data relationships of a plurality of datasets. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 2, a method of inferring data relationships of a plurality of datasets 200 is illustrated. In some embodiments, the method 200 is performed by the system 100.

At 210, data contents and/or metadata, of the plurality of datasets are algorithmically scanned to extract features of each of the datasets. Each feature has an associated weight. At 220, the datasets are clustered into clusters based on at least some of the weighted features. At 230, a precise similarity metric is computed between datasets in each cluster based on their weighted features. At 240, datasets with precise similarity metrics above a threshold quantity are inferred as being likely related. At 250, information regarding the inferred likely related datasets is provided Turning to FIG. 3, a method of inferring data relationships of a plurality of datasets 300 is illustrated. In some embodiments, the method 300 is performed by the system 100.

At 310, data contents and/or metadata contents of the plurality of datasets are algorithmically scanned to extract features of each of the datasets. Each feature has an associated weight. At 320, a sim-hash of each dataset is computed based on at least some of the weighted features. At 330, the datasets are clustered into clusters based, at least in part, upon the computed sim-hash.

At 340, a precise similarity metric is computed between datasets in each cluster based on their weighted features. At 350, datasets with precise similarity metrics above a threshold quantity are inferred as being likely related. At 360, providing information regarding the inferred likely related datasets.

Described herein is a system for inferring data relationships of a plurality of datasets, comprising: a processing system comprising a processor and a memory having computer-executable instructions stored thereupon which, when executed by the processor, cause the processing system to: algorithmically scan at least one of data contents or metadata contents of the plurality of datasets to extract features of each of the datasets, wherein each feature has an associated weight; cluster the datasets into clusters based on at least some of the weighted features; compute a precise similarity metric between datasets in each cluster based on their weighted features; infer datasets with precise similarity metrics above a threshold quantity as being likely related; and provide information regarding the inferred likely related datasets.

The system can further include the memory having further computer-executable instructions stored thereupon which, when executed by the processor, cause the processing system to: scan metadata contents of the plurality of datasets to extract features of the datasets, wherein the features comprise one or more of a timestamp, a dataset name, one or more column names, one or more column types, or a tag.

The system can further include the memory having further computer-executable instructions stored thereupon which, when executed by the processor, cause the processing system to: normalize the extracted features. The system can further include wherein clustering the datasets into clusters based on the weighted features is performed using a min-hash or a sim-hash of at least some of the weighted features. The system can further include wherein the features comprise one or more aspects related to a structure of data within a particular dataset including one or more of a name, a datatype, or a data format.

The system can further include wherein the features comprise one or more aspects related to a profile of data within the dataset including one or more of a data profile, a length histogram, a value histogram, a minimum value, a maximum value, a min-hash, a sim-hash, a data sketch, a pattern match, or a data sample. The system can further include wherein the weighted features comprise at least one of a min-hash or a sim-hash computed on at least a portion of data contents or metadata of the dataset. The system can further include wherein the precise similarity metric is computed using a Jaccard similarity function or a cosine similarity function of at least some of the weighted features.

The system can further include wherein clustering the datasets into clusters based on at least some of the weighted features is performed iteratively with results of each iteration combined together to define the clusters. The system can further include wherein text frequency-inverse document frequency (TF-IDF) is utilized to determined associated weights of at least some of the features.

Described herein is a method of inferring data relationships of a plurality of datasets, comprising: algorithmically scanning at least one of data contents or metadata contents of the plurality of datasets to extract features of each of the datasets, wherein each feature has an associated weight; computing a sim-hash of each dataset based on at least some of the weighted features; clustering the datasets into clusters based, at least in part, upon the computed sim-hash; computing a precise similarity metric between datasets in each cluster based on their weighted features; inferring datasets with precise similarity metrics above a threshold quantity as being likely related; and providing information regarding the inferred likely related datasets.

The method can further include receiving user feedback in response to the information provided regarding the inferred likely related datasets; and modifying at least some of the weights associated with features in accordance with the received user feedback. The method can further include wherein the features comprise one or more aspects related to a structure of data within a particular dataset including one or more of a name, a datatype, or a data format.

The method can further include wherein the features comprise one or more aspects related to a profile of data within the dataset including one or more of a data profile, a length histogram, a value histogram, a minimum value, a maximum value, a min-hash, a sim-hash, a data sketch, a pattern match, or a data sample. The method can further include wherein the precise similarity metric is computed using a Jaccard similarity function or a cosine similarity function of at least some of the weighted features.

Described herein is a computer storage media storing computer-readable instructions that when executed cause a computing device to: algorithmically scan at least one of data contents or metadata contents of the plurality of datasets to extract features of each of the datasets, wherein each feature has an associated weight; compute a sim-hash of each dataset based on at least some of the weighted features; cluster the datasets into clusters based, at least in part, upon the computed sim-hash; compute a precise similarity metric between datasets in each cluster based on their weighted features; infer datasets with precise similarity metrics within above a threshold quantity as being likely related; and provide information regarding the inferred likely related datasets.

The computer storage media can further include wherein the features comprise one or more aspects related to a structure of data within a particular dataset including one or more of a name, a datatype, or a data format. The computer storage media can further include wherein the features comprise one or more aspects related to a profile of data within the dataset including one or more of a data profile, a length histogram, a value histogram, a minimum value, a maximum value, a min-hash, a sim-hash, a data sketch, a pattern match, or a data sample.

The computer storage media can further include wherein the precise similarity metric is computed using a Jaccard similarity function or a cosine similarity function of at least some of the weighted features. The computer storage media can further include wherein the information provided regarding the inferred likely related datasets comprises metrics with respect to the basis for the inferred relationship based, at least in part, upon the extracted features.

Figure 4:
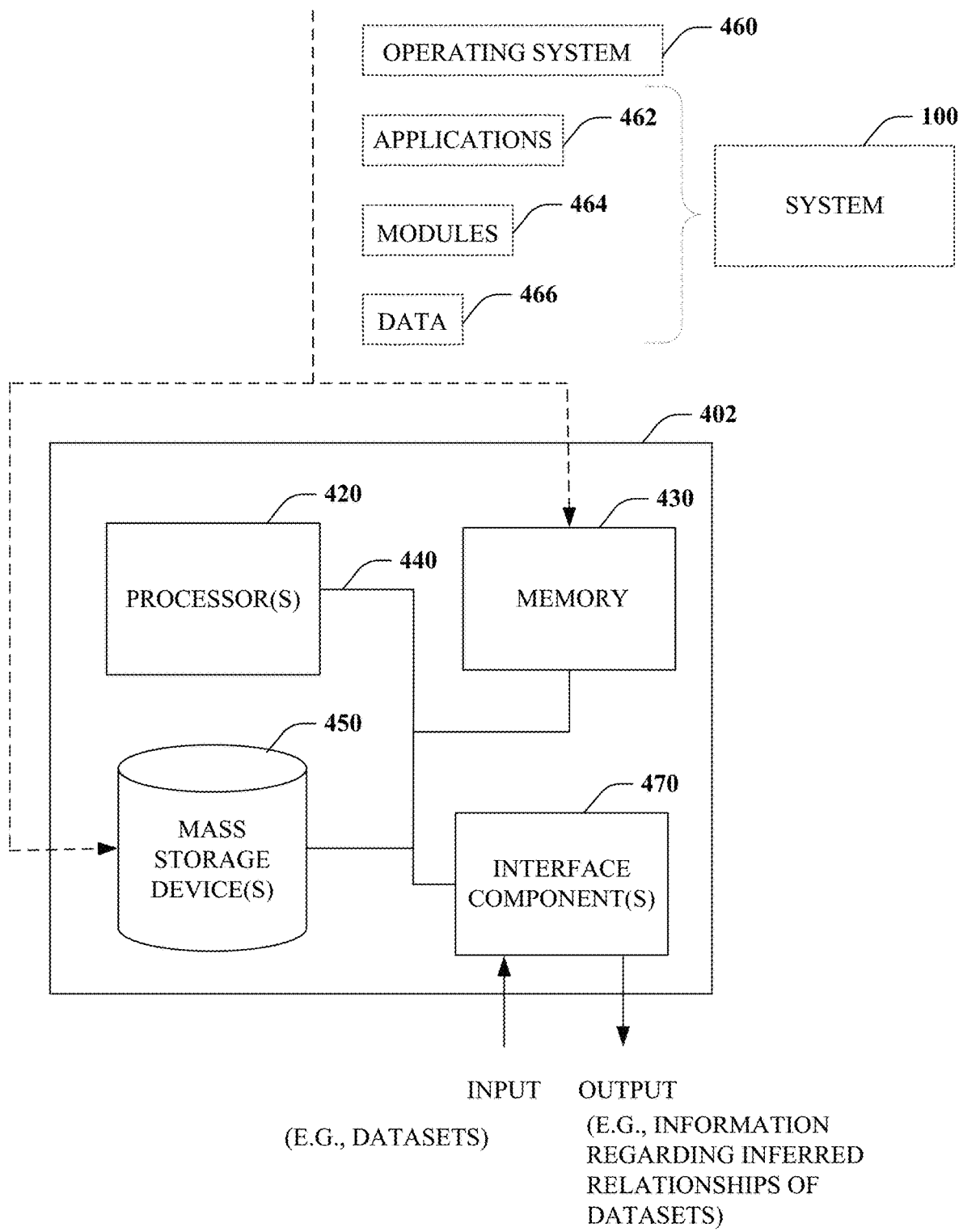
FIG. 4 is a functional block diagram that illustrates an exemplary computing system.

With reference to FIG. 4, illustrated is an example general-purpose processing system, computer or computing device 402 (e.g., mobile phone, desktop, laptop, tablet, watch, server, hand-held, programmable consumer or industrial electronics, set-top box, game system, compute node, etc.). For instance, the computing device 402 may be used in a system for inferring data relationships of datasets 100.

The computer 402 includes one or more processor(s) 420, memory 430, system bus 440, mass storage device(s) 450, and one or more interface components 470. The system bus 440 communicatively couples at least the above system constituents. However, it is to be appreciated that in its simplest form the computer 402 can include one or more processors 420 coupled to memory 430 that execute various computer executable actions, instructions, and or components stored in memory 430. The instructions may be, for instance, instructions for implementing functionality described as being carried out by one or more components discussed above or instructions for implementing one or more of the methods described above.

The processor(s) 420 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 420 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 420 can be a graphics processor.

The computer 402 can include or otherwise interact with a variety of computer-readable media to facilitate control of the computer 402 to implement one or more aspects of the claimed subject matter. The computer-readable media can be any available media that can be accessed by the computer 402 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 402. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 430 and mass storage device(s) 450 are examples of computer-readable storage media. Depending on the exact configuration and type of computing device, memory 430 may be volatile (e.g., RAM), non-volatile (e.g., ROM, flash memory, etc.) or some combination of the two.

By way of example, the basic input/output system (BIOS), including basic routines to transfer information between elements within the computer 402, such as during start-up, can be stored in nonvolatile memory, while volatile memory can act as external cache memory to facilitate processing by the processor(s) 420, among other things.

Mass storage device(s) 450 includes removable/non-removable, volatile/non-volatile computer storage media for storage of large amounts of data relative to the memory 430. For example, mass storage device(s) 450 includes, but is not limited to, one or more devices such as a magnetic or optical disk drive, floppy disk drive, flash memory, solid-state drive, or memory stick.

Memory 430 and mass storage device(s) 450 can include, or have stored therein, operating system 460, one or more applications 462, one or more program modules 464, and data 466. The operating system 460 acts to control and allocate resources of the computer 402. Applications 462 include one or both of system and application software and can exploit management of resources by the operating system 460 through program modules 464 and data 466 stored in memory 430 and/or mass storage device (s) 450 to perform one or more actions. Accordingly, applications 462 can turn a general-purpose computer 402 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 462, and include one or more modules 464 and data 466 stored in memory and/or mass storage device(s) 450 whose functionality can be realized when executed by one or more processor(s) 420.

In accordance with one particular embodiment, the processor(s) 420 can correspond to a system on a chip (SOC) or like architecture including, or in other words integrating, both hardware and software on a single integrated circuit substrate. Here, the processor(s) 420 can include one or more processors as well as memory at least similar to processor(s) 420 and memory 430, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 402 also includes one or more interface components 470 that are communicatively coupled to the system bus 440 and facilitate interaction with the computer 402. By way of example, the interface component 470 can be a port (e.g., serial, parallel, PCMCIA, USB, FireWire, etc.) or an interface card (e.g., sound, video, etc.) or the like. In one example implementation, the interface component 470 can be embodied as a user input/output interface to enable a user to enter commands and information into the computer 402, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 470 can be embodied as an output peripheral interface to supply output to displays (e.g., LCD, LED, plasma, etc.), speakers, printers, and/or other computers, among other things. Still further yet, the interface component 470 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   algorithmically scan at least one of data contents or metadata contents of a group of datasets to extract features of the datasets, wherein the features have associated weights;
   cluster the group of datasets into a plurality of clusters including at least a first cluster and a second cluster based on at least some of the weighted features, the first cluster including a first subgroup of datasets, the second cluster including a second subgroup of datasets;
   compute precise similarity metrics among the first subgroup of datasets in the first cluster based on their weighted features;
   infer related datasets within the first subgroup of datasets based on the precise similarity metrics being above a threshold quantity; and
   provide information regarding the related datasets.

2. The system of claim 1, the memory having further computer-executable instructions stored thereupon which, when executed by the processor, cause the system to:
   scan metadata contents of the group of datasets to extract the features of the datasets, wherein the features comprise one or more of: a timestamp, a dataset name, one or more column names, one or more column types, or a tag.

3. The system of claim 1, the memory having further computer-executable instructions stored thereupon which, when executed by the processor, cause the system to:
   normalize the features.

4. The system of claim 1, wherein clustering the datasets into clusters based on the weighted features is performed using a min-hash or a sim-hash of at least some of the weighted features.

5. The system of claim 1, wherein the features comprise one or more aspects related to a structure of data within a particular dataset including one or more of a name, a datatype, or a data format.

6. The system of claim 1, wherein the features comprise one or more aspects related to a profile of data within the dataset including one or more of a data profile, a length histogram, a value histogram, a minimum value, a maximum value, a min-hash, a sim-hash, a data sketch, a pattern match, or a data sample.

7. The system of claim 1, wherein the precise similarity metrics are computed using a Jaccard similarity function or a cosine similarity function of at least some of the weighted features.

8. The system of claim 1, wherein clustering the datasets into the plurality of clusters is performed iteratively with results of each iteration combined together to define the plurality of clusters.

9. The system of claim 1, wherein text frequency-inverse document frequency (TF-IDF) is utilized to determine the associated weights of at least some of the features.

10. A method, comprising:
    algorithmically scanning at least one of data contents or metadata contents of a group of datasets to extract features of the datasets, wherein the features have associated weights;
    computing sim-hashes of the group of datasets based on at least some of the weighted features;
    clustering the group of datasets into a plurality of clusters including at least a first cluster and a second cluster based, at least in part, upon the computed sim-hashes, the first cluster including a first subgroup of datasets, the second cluster including a second subgroup of datasets;
    computing precise similarity metrics among the first subgroup of datasets in the first cluster based on their weighted features;
    inferring related datasets within the first subgroup of datasets based on the precise similarity metrics being above a threshold quantity; and
    providing information regarding the related datasets.

11. The method of claim 10, further comprising:
    receiving user feedback in response to the information provided regarding the related datasets; and
    modifying at least some of the weights associated with features in accordance with the received user feedback.

12. The method of claim 10, wherein the features comprise:
    one or more aspects related to a structure of data within a particular dataset including one or more of a name, a datatype, or a data format; or
    one or more aspects related to a profile of data within the particular dataset including one or more of a data profile, a length histogram, a value histogram, a minimum value, a maximum value, a min-hash, a sim-hash, a data sketch, a pattern match, or a data sample.

13. A computer storage media storing computer-readable instructions that, when executed, cause a computing device to:
    algorithmically scan at least one of data contents or metadata contents of a group of datasets to extract features of the datasets, wherein the features have associated weights;
    compute sim-hashes of the group of datasets based on at least some of the weighted features;
    cluster the group of datasets into a plurality of clusters including a first cluster and a second cluster based, at least in part, upon the computed sim-hashes, the first cluster including a first subgroup of datasets, the second cluster including a second subgroup of datasets;
    compute precise similarity metrics among the first subgroup of datasets in the first cluster based on their weighted features;
    infer related datasets within the first subgroup of datasets based on the precise similarity metrics being above a threshold quantity; and
    provide information regarding the related datasets.

14. The computer storage media of claim 13, wherein the information provided regarding the related datasets comprises the precise similarity metrics or the features.

15. The system of claim 1, wherein the group of datasets are clustered using a machine-learning algorithm trained in an unsupervised manner.

16. The system of claim 1, wherein the computer-executable instructions cause the system to:
    avoid computing the precise similarity metrics between the first subgroup of datasets and the second subgroup of datasets.

17. The method of claim 10, wherein clustering the group of datasets includes using a machine-learning algorithm trained in an unsupervised manner.

18. The method of claim 10, wherein computing the precise similarity metrics among the first subgroup of datasets avoids computing the precise similarity metrics between the first subgroup of datasets and the second subgroup of datasets.

19. The computer storage media of claim 13, wherein the group of datasets are clustered using a machine-learning algorithm trained in an unsupervised manner.

20. The computer storage media of claim 13, wherein computing the precise similarity metrics among the first subgroup of datasets avoids computing the precise similarity metrics between the first subgroup of datasets and the second subgroup of datasets.

* * * * *